F. M. DOAK.
END JOINT FOR CORRUGATED PIPE SECTIONS.
APPLICATION FILED DEC. 10, 1908.

946,207. Patented Jan. 11, 1910.

WITNESSES.
Arthur L. Slee.
S. Constine.

INVENTOR.
F. M. Doak.
by N. A. Acker
his atty.

UNITED STATES PATENT OFFICE.

FREDERICK M. DOAK, OF SAN FRANCISCO, CALIFORNIA.

END JOINT FOR CORRUGATED-PIPE SECTIONS.

946,207.  Specification of Letters Patent.  Patented Jan. 11, 1910.

Application filed December 10, 1908. Serial No. 466,801.

*To all whom it may concern:*

Be it known that I, FREDERICK M. DOAK, a citizen of the United States, residing in the city and county of San Francisco and State of California, have invented certain new and useful Improvements in End Joints for Corrugated-Pipe Sections, of which the following is a specification.

The present invention relates to the construction of metallic pipe culverts for use in connection with all classes of modern construction relative to foundations, arches, cement floors and work generally of such character, although its use is mainly designed for culverts designed for roadways; the invention residing in the manner of forming the end joint of the pipe sections for securely locking or joining together the lengths of pipe and securing a tightness of the joint.

Ordinarily the pipe sections are riveted together, either prior to shipment or after the sections have been delivered, in either case the services of expert workmen or skilled labor being required to assemble and unite the sections.

The present invention dispenses with the necessity of skilled labor in the assembling and uniting of the sections, inasmuch as the riveting of the sections for the uniting of the same is disposed of, and in place thereof the ends of the pipe section are so constructed that the end of one section will slip or fit within the opposing end of an adjacent section, when, by means of a suitable clamp band encircling the loosely fitted or joined ends, the lap end of one section is drawn down or compressed onto the inserted end of the opposing section.

For the carrying out of the invention the pipe sections are corrugated with the ridges or furrows formed thereby circumferentially disposed, the securing clamp band being likewise corrugated so as to embrace the end ridge or furrow of the lap section of the pipe and firmly engage the same when drawn tight by means of a coupling bolt and compress said ridge or furrow onto the end ridge or furrow of the end of the pipe section inserted therein, so that when the clamp band is tightened the parts will be firmly interlocked.

To comprehend the invention reference should be had to the accompanying sheet of drawings, wherein—

Figure 1:
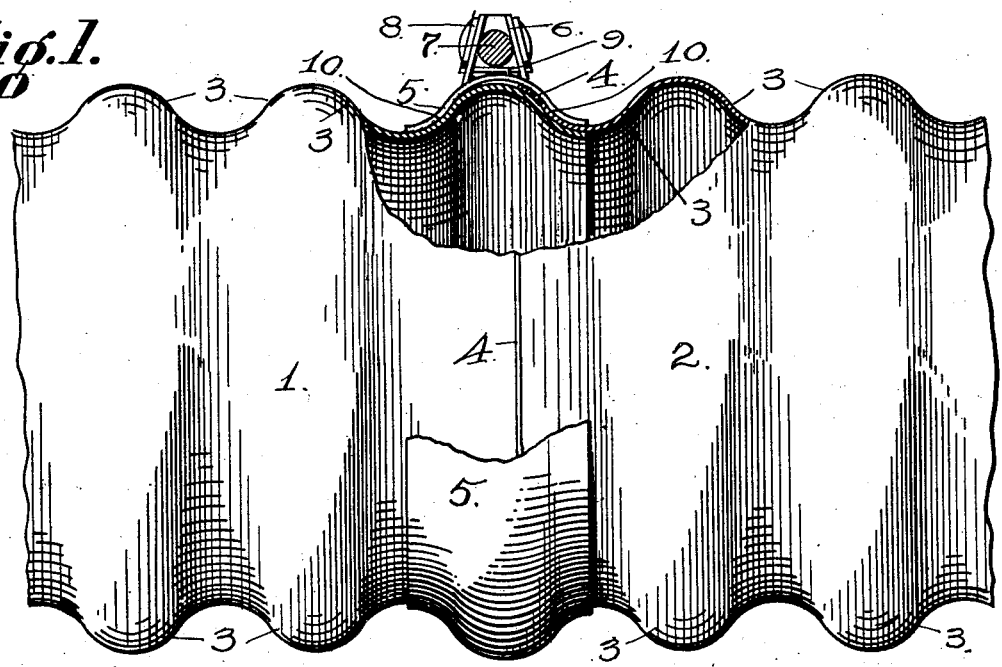
Figure 2:
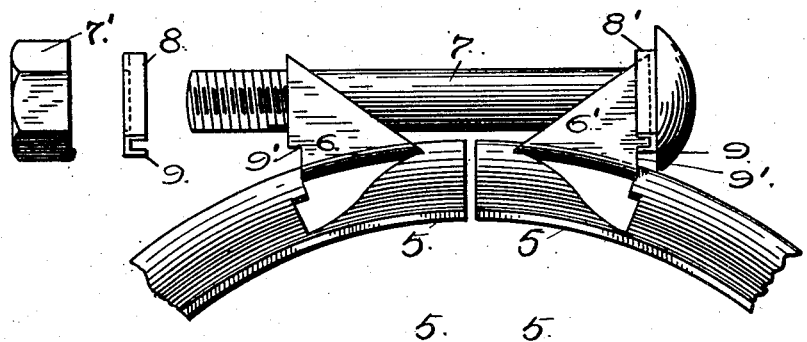
Figure 3:
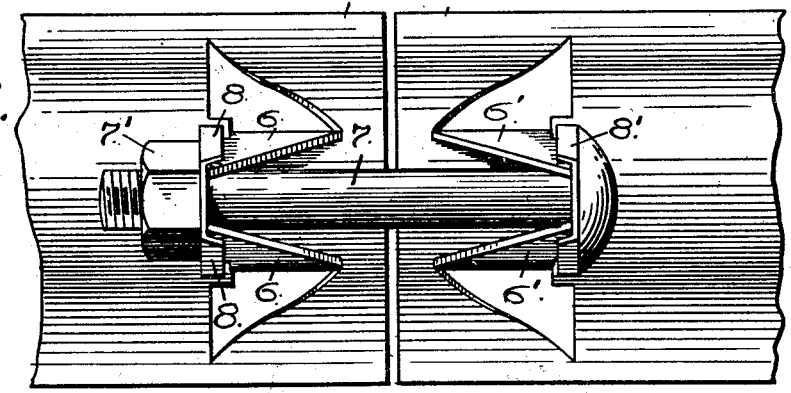

Figure 1 is a side elevation partly broken away illustrating the ends of pipe sections interlocked, the securing clamp band being partly broken. Fig. 2 is an enlarged broken side elevation of the clamp band with the securing bolt positioned, the tightening nut and one of the lug collars being detached. Fig. 3 is a plan view of the clamp band and the securing bolt, the bolt nut and collar detached in Fig. 2 being in position.

In the drawings, the numerals 1—2 designate interlocking pipe sections, each being formed with one end enlarged to receive the opposing end of an adjacent pipe section, Fig. 1 of the drawings. The pipe sections are composed of galvanized or black iron, which is corrugated so that the ridges or furrows 3 formed thereby are circumferentially disposed. The smaller end of the pipe section 1 slips into the enlarged end of the pipe section 2, so that the ridge or furrow of the smaller end of pipe section 1 will lie under the ridge or furrow of the enlarged end 4 of the adjacent pipe section 2, a slip joint between the sections being thus made. Ordinarily when the sections are thus assembled, the overlapping end of one section is riveted to the inserted end of the adjacent section, which work is not only slow and tedious, but requires the services of an expert workman and helper. Such manner of uniting the sections is expensive, and requires the exercise of considerable care. This expense is dispensed with in the present case by the employment of a clamp band 5, which, after the ends of the pipe sections have been loosely united by the slip joint, is placed around the joint end of the assembled sections and drawn tight so as to compress the lap end of one section onto the inserted end of the opposing section to cause the end ridge or furrow of one section to firmly interlock with the inserted end ridge or furrow of the adjacent section.

The clamp band 5 is formed with a single corrugation, and is of a width sufficient so that its ridge or furrow will register or embrace the overlapping end furrow or ridge of the pipe section 2. To unite or join the ends of the clamp band 5 and permit of the same being drawn tight to compress the lap end of the pipe section 2, the metal thereof adjacent each end is stamped and upset to form projecting end lugs 6—6′, between which works the securing bolt 7. The distance between each pair of end lugs 6—6′ is slightly greater at their base than the diameter of the securing bolt 7, which permits of the lugs being slightly contracted at their upper ends so that the distance between the same at such point will be less than the diameter of the securing bolt, which prevents the bolt falling from between the said lugs, Fig. 1 of the drawings.

The clamp band in length is slightly less than the circumference of the overlapping end of the pipe section 2, say one-eighth of an inch, so that in the drawing of the separated ends together, the lap end ridge or furrow of the enlarged overlapping end of the pipe section 2 will be compressed firmly onto the ridge or furrow of the inserted end of the adjacent pipe section 1. It will be understood that after corrugating the clamp band circumferentially, the same is then rolled to the external circumference of the pipe to which it is to be applied.

To hold the end lugs 6—6' from spreading when nut 7' is drawn up to tighten the clamp band, the washers 8—8' are provided, one being inserted between the outer ends of the lugs 6' and the head of the bolt 7, and the other between the nut 7' and the outer ends of the lugs 6. Each washer is formed with an inwardly extension 9, which fits within a recess 9' formed at the base of the outer end face of the lugs 6—6". The collars thus interlock with the end lugs 6—6', so that the same are held against displacement during the operation of tightening up of the securing bolt 7. As the clamp band is drawn together around the loosely fitted ends of the pipe sections, the pressure strains of the clamp band bear onto the lap ridge or furrow of the pipe section 1 at the points 10 throughout the circumference thereof, which pressure being at an angle to the diameter of the pipe, tends to draw together the ends of the pipe sections and securely interlock the registering end ridges or furrows of the said sections. It is obvious that as the pressure of the clamp band increases with the screwing up of the securing bolt 7, the tighter the interlocked ends of the pipe sections will be forced together, making the ends of the pipe sections a solid joint. Inasmuch as the clamp band completely encircles the interlocked ends of the pipe sections, three thicknesses of the metal will occur at the joint, thus materially strengthening the joint of the united sections.

By the use of the described invention the pipe sections may be quickly assembled and the joints thereof made as the work progresses, and this without the use of skilled labor; thereby materially reducing the expense incident to work of this character, inasmuch as the simplicity of uniting the sections in the field of work enables the same to be successfully performed by unskilled workmen, and at the same time dispenses with the use of special tools for assembling the parts to any required length on the ground.

Having thus described the invention what is claimed as new and desired to be secured by Letters Patent is—

1. The combination with the end furrow of a circumferentially corrugated pipe section of the end furrow of an adjacent corrugated pipe section loosely inserted therein, a clamp band encircling the joint of the loosely connected ends of the pipe sections, and means for tightening the clamp band to compress the overlapping furrow of one pipe section onto the inserted furrow of the adjacent pipe section.

2. The means for compressing the lap furrow of a corrugated pipe section onto an inserted furrow of an adjacent pipe section to form an end joint, the same comprising a clamp band which encircles the end joint of the pipe sections, bolt lugs projecting from the end portions of the clamp band, a securing bolt working between the said lugs, a tightening nut, and collars interposed between the bolt, the tightening nut and the bolt lugs to hold the lugs against spreading on the drawing together of the clamp band to compress the lap furrow of one pipe section onto the inserted furrow of an adjacent pipe section.

3. In a clamp band for the described purpose, the combination with the bolt lugs projecting from the end portions thereof, of a securing bolt working between said lugs, a tightening nut working on the securing bolt for drawing together the clamp band, a collar interposed between the head of the bolt and one pair of the bolt lugs, a similar collar interposed between the tightening nut and the opposing pair of bolt lugs, a projection extending from each of said collars, and a recess formed in each pair of the bolt lugs to receive respectively the projections of the collars for holding the same in position, the said collars serving to prevent a spreading of the bolt lugs during the tightening of the clamp band.

In testimony whereof I have signed my name to this specification in the presence of two subscribing witnesses.

FREDERICK M. DOAK.

Witnesses:
N. A. ACKER,
WM. F. BOOTH.